(No Model.) 6 Sheets—Sheet 1.
W. MAIN.
DYNAMO ELECTRIC MACHINE AND ELECTROMOTOR.

No. 373,145. Patented Nov. 15, 1887.

WITNESSES:
John A. Rennie.
Paschal J. Ferrara.

INVENTOR:
William Main,
By his Attorneys,
Arthur G. Fraser & Co.

(No Model.) 6 Sheets—Sheet 2.
W. MAIN.
DYNAMO ELECTRIC MACHINE AND ELECTROMOTOR.
No. 373,145. Patented Nov. 15, 1887.
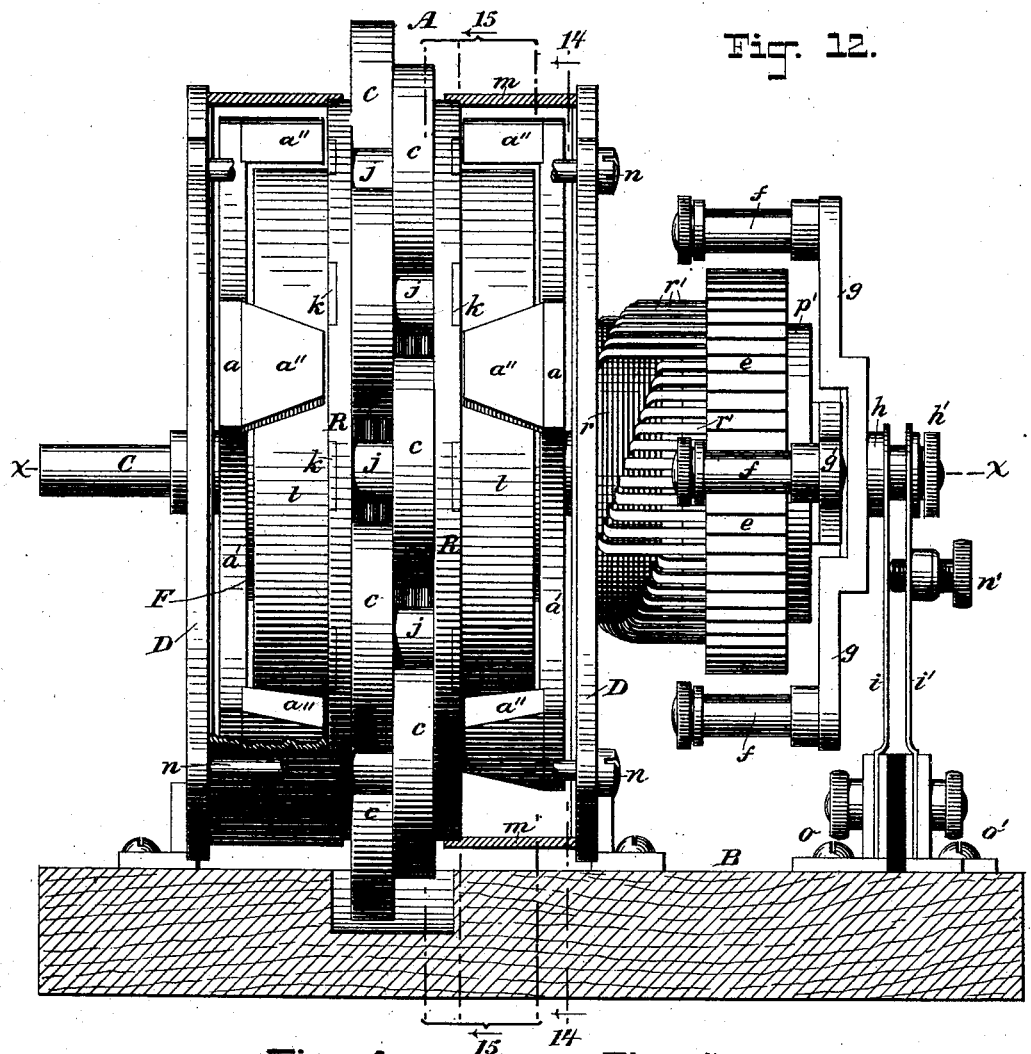
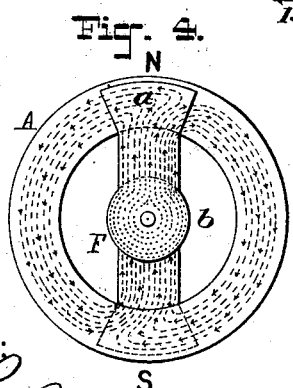
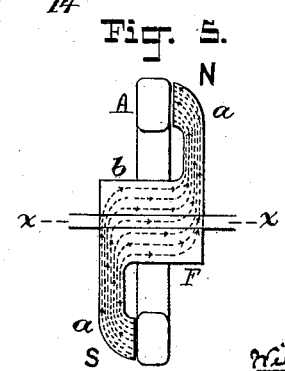
WITNESSES:
John A. Kennid.
Paschal J. Ferrara.
INVENTOR:
William Main,
By his Attorneys,
Arthur E. Bracer &Co (No Model.) 6 Sheets—Sheet 3.
W. MAIN.
DYNAMO ELECTRIC MACHINE AND ELECTROMOTOR.
No. 373,145. Patented Nov. 15, 1887.
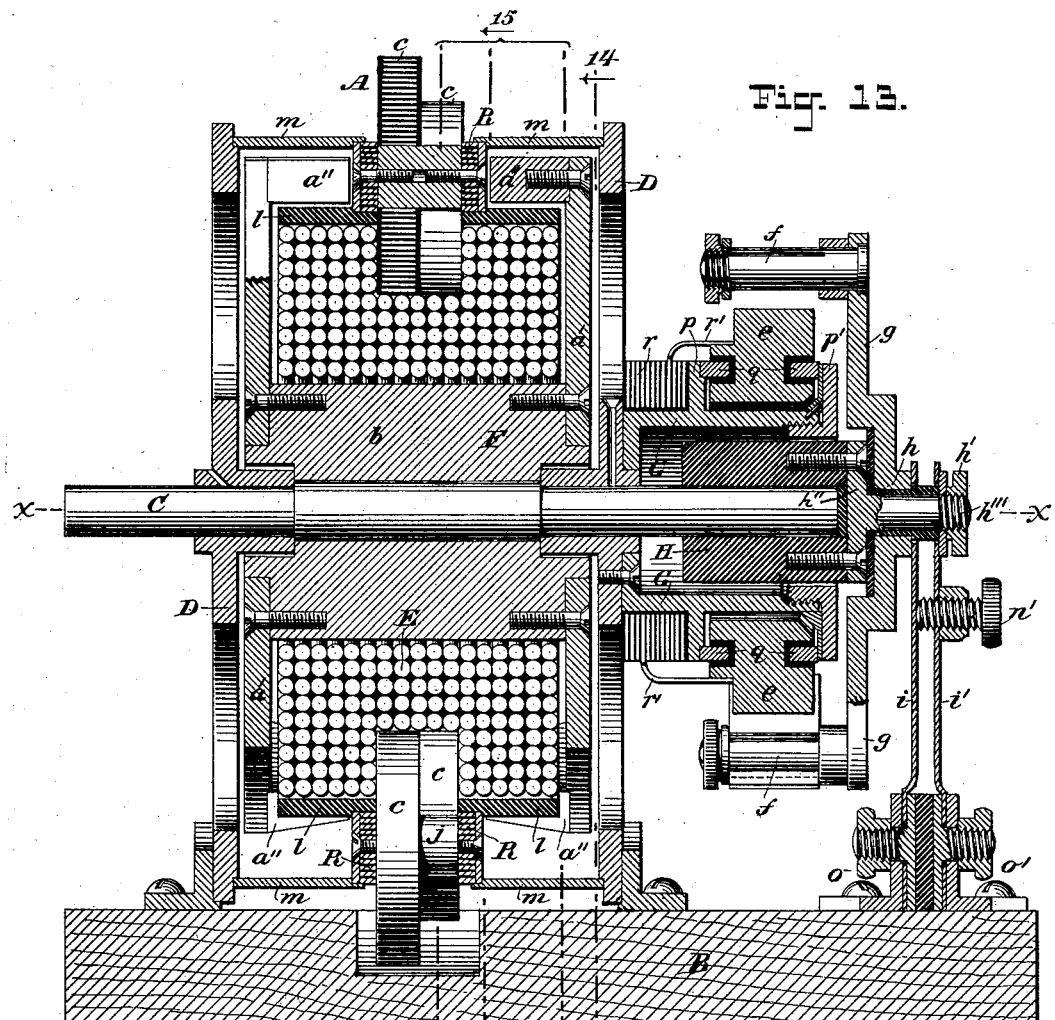
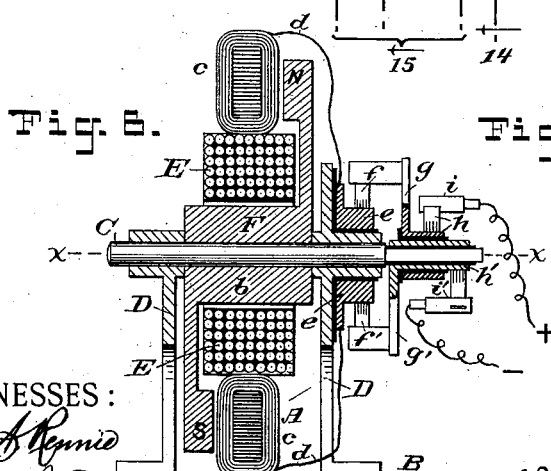
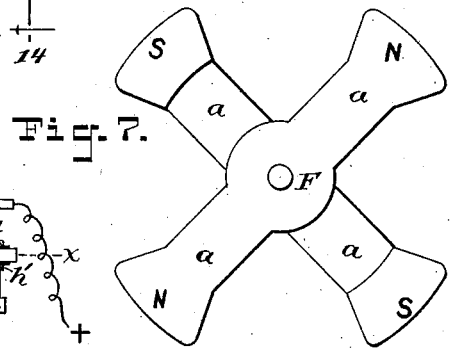
WITNESSES:
John A. Rennie
Paschal J. Ferrara.
INVENTOR:
William Main,
By his Attorneys,
Arthur E. Brown & Co.

(No Model.) 6 Sheets—Sheet 4.

W. MAIN.
DYNAMO ELECTRIC MACHINE AND ELECTROMOTOR.

No. 373,145. Patented Nov. 15, 1887.

WITNESSES:
John A. Reynice
Paschal J. Ferrard

INVENTOR:
William Main,
By his Attorneys,
Arthur C. Fraser & Co.

(No Model.) 6 Sheets—Sheet 5.

W. MAIN.
DYNAMO ELECTRIC MACHINE AND ELECTROMOTOR.

No. 373,145. Patented Nov. 15, 1887.

WITNESSES:
John A. Rennie.
Paschal J. Ferrara.

INVENTOR:
William Main,
By his Attorneys,
Arthur G. Fraser & Co.

(No Model.) 6 Sheets—Sheet 6.
W. MAIN.
DYNAMO ELECTRIC MACHINE AND ELECTROMOTOR.
No. 373,145. Patented Nov. 15, 1887.
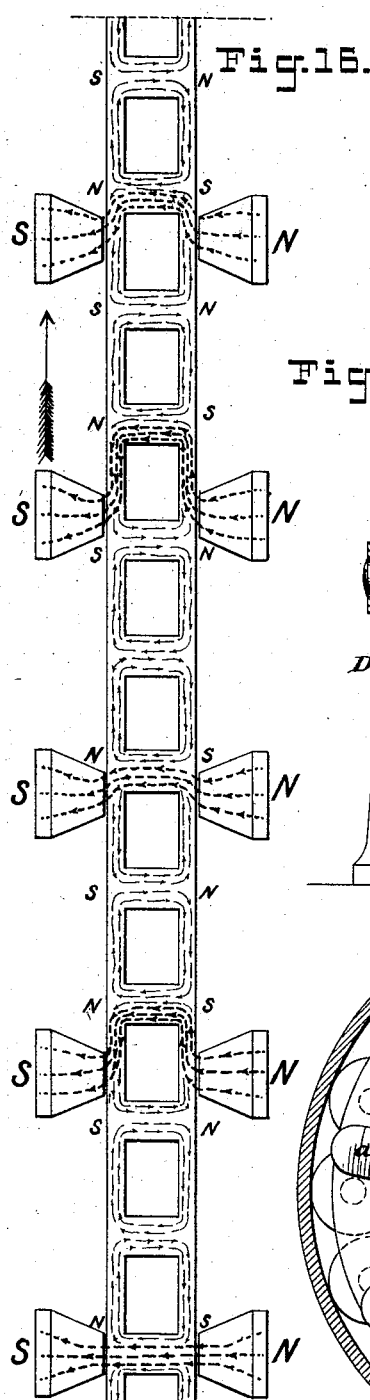
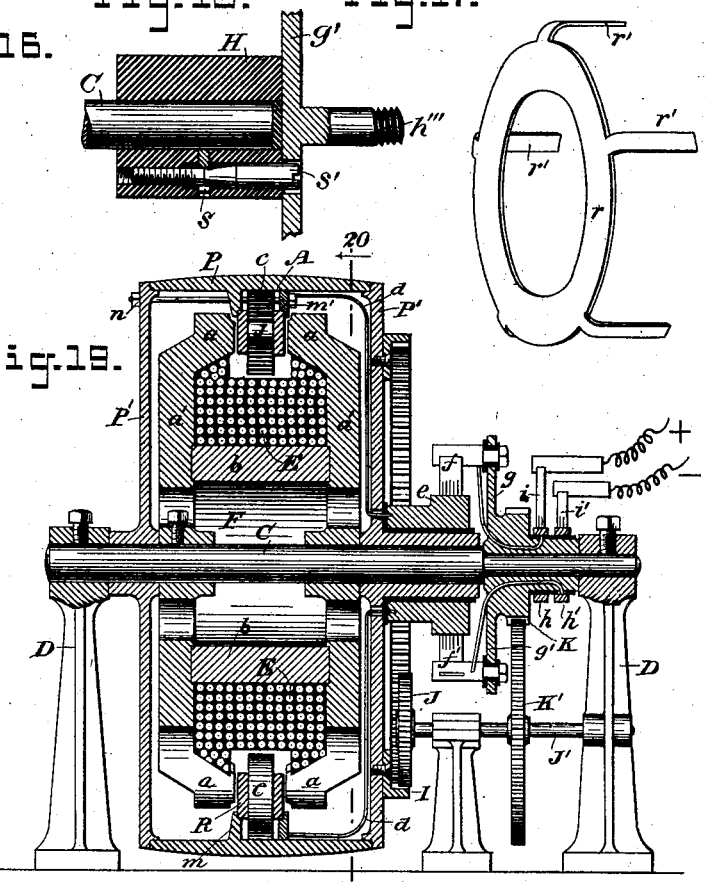
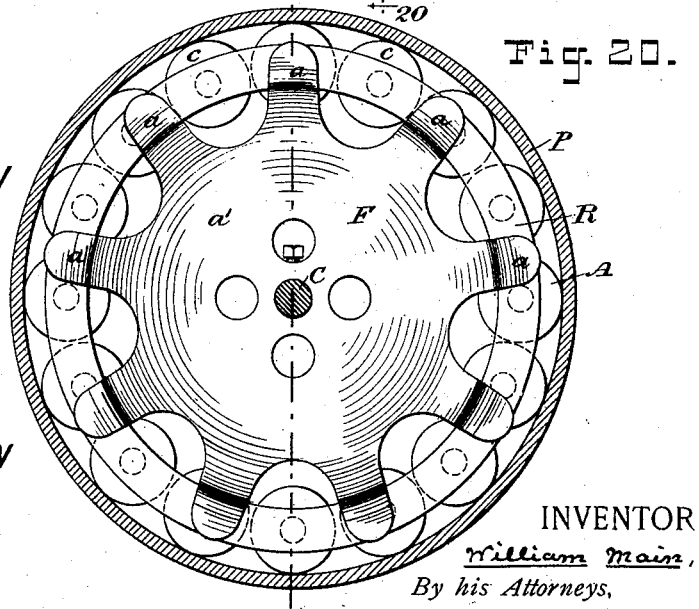
WITNESSES:
John H. Reynie
Paschal J. Ferrara
INVENTOR:
William Main,
By his Attorneys,
Arthur C. Fraser & Co.

UNITED STATES PATENT OFFICE.

WILLIAM MAIN, OF BROOKLYN, NEW YORK.

DYNAMO-ELECTRIC MACHINE AND ELECTROMOTOR.

SPECIFICATION forming part of Letters Patent No. 373,145, dated November 15, 1887.

Application filed April 18, 1887. Serial No. 235,179. (No model.)

*To all whom it may concern:*

Be it known that I, WILLIAM MAIN, a citizen of the United States, residing at Brooklyn, in the county of Kings and State of New York, have invented certain new and useful Improvements in Dynamo-Electric Machines and Electromotors, of which the following is a specification.

This invention relates both to electromotors and dynamo-electric generating-machines. Its objects are to gain the utmost efficiency with the least weight and the greatest compactness that are practically possible in such machines.

To this end I have introduced by this invention some new principles of construction or arrangement of parts in machinery of this class.

Before proceeding to describe the mechanical constructions which I have devised for the operative machines built according to my invention, I will endeavor to make clear the new general principles which it involves. In so doing I will make reference to some of the figures of the accompanying drawings, wherein—

Figure 1:
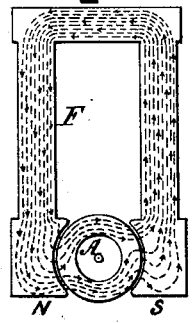
Figure 2:
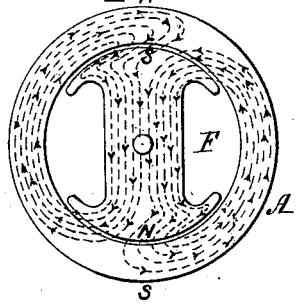
Figure 3:
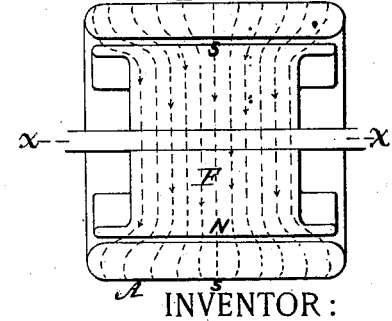

Figures 1, 2, and 3 are diagrammatic views illustrative of constructions already in use. Figs. 4 and 5 are diagrammatic views illustrative of the generic principle of my invention. Figs. 6 to 10, inclusive, are views, partly diagrammatic, illustrative of the development of my invention in its adaptation to practical use. Figs. 11 to 18, inclusive, are views illustrating a complete electromotor constructed according to my invention, and Figs. 19 and 20 illustrate modifications of which my invention is susceptible.

Each of the views will be more minutely described hereinafter.

In a dynamo or motor the magnetic circuit consists of two parts—one comprised in the field-magnet and the other in the armature. Throughout this circuit there exists a condition of strain known as "magnetism," and which develops itself along certain lines known as "lines of force." When a magnetic circuit is closed and is of nearly equal magnetic conductivity throughout, these lines of force are confined entirely within the circuit and give no external manifestations; but on any break being made in the magnetic connection the lines of force are compelled to stretch themselves through air or other non-magnetic body which opposes an extreme resistance and proportionally reduces the strength of the magnetic excitation. In a dynamo it is necessary, for mechanical reasons, to leave a gap or air-space at two places in the magnetic circuit to divide the moving from the stationary part thereof. Fig. 1 shows the magnetic circuit of an ordinary type of dynamo, A being the armature and F the field-magnet. The dotted lines show approximately the direction and distribution of the lines of force.

The magnetic strain is necessarily equal at all parts of a magnetic circuit, so that, as in an electric circuit, conditions that increase resistance and lessen flow or magnetic strain at one point will also equally reduce the magnetism at all other points. Thus the reduction of the area of a magnetic circuit at one point will crowd together the magnetic lines at that point, and, if the excitation is sufficient, will result in saturation, thereby forcing some of the lines of force to pass through the air, and by the resistance thus created reducing proportionally the magnetism on the entire circuit.

In the construction of a dynamo or motor the following conditions are most desirable: First, least length of the iron circuit and least possible break in it; second, greatest cross-section for the iron circuit; third, greatest length of the electric conductor; fourth, least distance of the iron from the electric conductor. The first two of these conditions relate to the resistance of the magnetic circuit, which should be kept as low as possible to avoid saturation. The last two relate to the reaction between the iron and the conducting-wire, the object being to insure the conversion of the greatest number of lines of force that is possible without waste. For example, experience proves that a greater total magnetization may be realized from a given length of wire by winding it in a shallow coil around a large iron drum than by winding it in a thicker coil around a core of less diameter. Bearing in mind these general principles, I will now proceed to indicate the generic feature of my present invention.

Let us assume, as an example, an annular armature of the character of a Gramme ring. On passing a current through its coils it develops magnetic poles at diametrically-opposite sides. In the absence of a field-magnet the lines of force would be closed through the air. In the ordinary constructions of dynamos a field-magnet is arranged exterior to the ring, which closes the magnetic circuit by gathering together all the external lines of force and passing them in a compact bundle through the U-shaped iron of the field-magnet. This is shown graphically in Fig. 1. It is thus far the almost universal construction in dynamos, being varied only in arrangement and mechanical construction, but not in principle. Its defect lies in the necessity for considerable length of field-magnet cores, thus creating unnecessary magnetic resistance, and also involving in most constructions some magnetic short-circuiting or leaking of the lines of force across between the field-cores, instead of passing them all through the armature. It also involves a great disproportion in weight and bulk between the armature and the field-magnet, whereas theoretically the stationary and moving parts of the magnetic circuit should be of equal mass, although in practice it is found desirable in dynamos to give the field-magnet considerable preponderance of weight. This disproportion is essential in self-exciting dynamos, as otherwise the counter-current on starting them would neutralize the direct current, and there would be no excitation of the field.

In a dynamo the current induced by the rotation of the armature opposes the stationary lines of force and tends to drive them back into the field-magnet poles. In a motor, on the contrary, there is no such effect, since it is necessarily operated by an independent and overmastering current, and the stationary and moving magnetic lines created thereby oppose each other in one tangential direction and re-enforce each other in the other; hence the theoretical equal division of the armature and field-magnet should be for a motor the best condition.

Figs. 2 and 3 illustrate a method of closing the magnetic circuit that has been used with motors. The armature A is here made of large diameter, and the field-magnet F is arranged within it, crossing diametrically from one side to the other, (see Fig. 2,) in the plane of the armature. (See Fig. 3.) The dotted lines show the direction of the lines of force. This disposition of field-magnet has the disadvantage that the field-magnet is too small and its polar arc is too large proportionally to the armature, so that on the one hand the field-magnet has insufficient magnetic force to effect a thorough reaction with the armature, and on the other hand the wide poles magnetically short-circuit and render useless a large proportion of the armature. In motors made according to this plan the field-magnet has only twenty-five per cent., while the armature has seventy-five per cent., of the weight. Thus heretofore the magnetic circuit between the opposite poles of an armature has been closed in two different ways: by means of (1) a field-magnet entirely outside of the armature, and (2) a field-magnet entirely inside of the armature. In both cases the number of poles has been multiplied, using four, six, eight, or more poles instead of two. In either case either the armature or field-magnet may rotate. For mechanical reasons the lighter member is best made the rotative one, so that in machines of the first class the armature has been made rotative and in those of the second class the field-magnet has been made to rotate. By the armature I mean the part in the coils of which the alterations of current occur, and by the field-magnet I mean the part in the coils of which the current is continuous.

Figs. 4 and 5 illustrate the principle of my invention. Fig. 4 is a face view of the armature answering to Fig. 2, and Fig. 5 is a diametrical section cut from N to S, answering to Fig. 3. A is the ring-armature—such, for example, as a Gramme ring, and F is the field-magnet. The magnetic circuit is closed by the field-magnet passing through the armature from one side to the other thereof, thereby crossing the plane of the armature. The armature consists of a series of coils arranged in a circle according to any of the various methods of winding heretofore practiced. It is essential that the winding shall be such as to develop alternate north and south poles, presented to the poles of the field magnet as the circumference of the armature is traversed. Thus there may be one N and one S pole at diametrically-opposite points, or these may be multiplied to any practicable number. The opposite ends of poles $a\ a$ of the field-magnet are exterior to the armature, and come into close proximity therewith on its opposite sides. The middle portion, or core $b$, of the field-magnet passes through the open center of the armature in a direction parallel with the axis thereof, (i. e., the axis of rotation,) or approximately so. The permanent lines of force are thus directed through the center of the armature in a short column or tube, to which any desirable cross-section may be given. Their direction is clearly shown in Fig. 5, where $x\ x$ denote the axis of rotation. At opposite ends of the core the lines of force may be distributed to as many points around the circumference of the armature as may be desirable by means of radial pole-pieces, all of which at one side or end will have one polarity, while those at the opposite side or end will have the contrary polarity. In Figs. 4 and 5 only one such pole-piece $a$ is shown at each end of the core, in order to clearly illustrate the principle of my invention embodied in a construction of the utmost simplicity.

Figs. 4 and 5 are in the nature of diagrams, no coils being shown.

In Fig. 6 I have shown, in addition to the parts shown in Figs. 4 and 5, the exciting-coils and other accessories essential to the construction of an electromotor or dynamo of the simplest kind according to the principle of my invention, the view being a vertical section cut in the plane of the rotative axis. The ring-armature A is wound according to the well-known Gramme winding, and is fixed to a base-plate, B. Within it is fixed the exciting coil E for the field-magnet F. This coil E is wound around the core *b* of the field-magnet, a clearance-space being left between them to permit of the rotation of the field-magnet while the coil E remains stationary. The field-magnet is mounted on an axial shaft, C, which has bearings in upright frames D D, fixed on the base B. Since in this construction the armature is stationary and the field-magnet revolves, it is necessary to employ a commutator having stationary segments and revolving brushes. The separate coils *c c* of the armature are connected between them by conductors *d d* to the respective segments *e e* of the commutator, which segments are fixed to but insulated from one of the upright frames D. The brushes *f f'* of the commutator are carried by diametrically-opposite arms *g g'*, which are fixed on the shaft C, but insulated therefrom and from each other. The arm *g* is connected to a sleeve, *h*, and the arm *g'* to a sleeve, *h'*. Fixed brushes *i* and *i'* are arranged to make contact with these sleeves, respectively, and serve for connection with the external circuit. The exciting-coil E may be connected in any of the ways now commonly known and practiced with dynamos or motors, as, for example, in series with the armature or in derivation with it, or partly in series and partly in derivation, or it may be connected with a distinct circuit in the case of a self-exciting machine. The passage of the current through the coil E magnetizes the field-magnet F, so that its poles *a a* develop, respectively, north and south polarity. The passage of the current through the Gramme-ring armature develops opposite poles therein at points slightly in advance of the pole-pieces *a a*, depending upon the adjustment of the brushes *f f'*. The field-poles are consequently attracted toward the poles in the armature, and move toward them, thus rotating the commutator-brushes and advancing the poles in the armature, thus maintaining the rotation. This is the action of my invention when employed as a motor. When used as a dynamo, the rotation of the field-magnet will set up currents in the armature-coils, which are collected and rectified by the commutator in the usual manner. The difference between a dynamo and a motor will consist mainly or entirely in the relative proportions of the parts. For a motor the armature and field-magnet should be approximately of equal magnetic capacity and of equal weight. For a dynamo the field-magnet should predominate over the armature.

In the practical application of my invention in connection with dynamos or motors of the Gramme-ring type, it is important that the number of pole-pieces *a a* should be increased in order to make the poles in the ring armature closer together, according to the principles well understood in the construction of what are known as "flat-ring dynamos." Fig. 7 is an end view of the field-magnet, constructed with four pole-pieces *a a*, two on each side. This results in the employment of four poles in the Gramme ring, like poles being diametrically opposite and contrary poles being ninety degrees apart.

I will not herein further describe the construction of motors or dynamos of the Gramme-ring type, since in another application for patent executed by me this day, (Serial No. 235,785, filed April 22, 1887,) I have fully and in detail illustrated and described such a machine as fully developed for practical use. For a more detailed understanding of my invention, as applied to such dynamos or motors, I therefore make reference to that application.

My present application is designed to include my generic invention, of which one species is claimed herein and another in my said other application.

Figure 8:
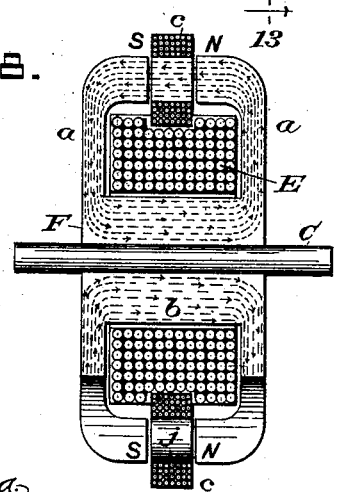
Figure 9:
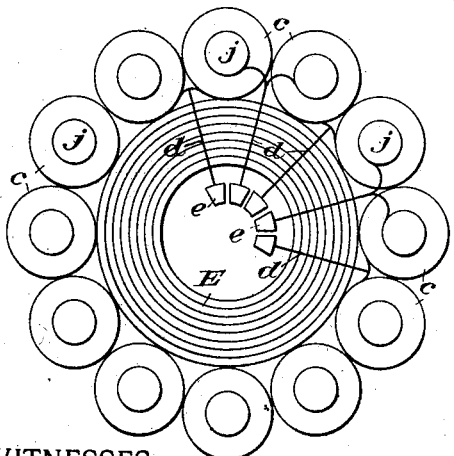
Figure 10:
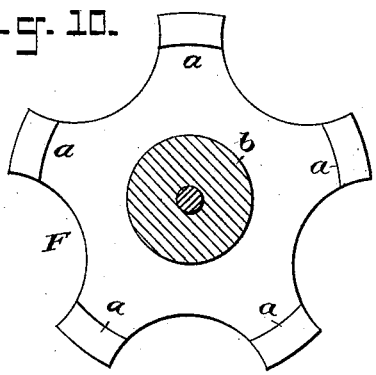

Figs. 8, 9, and 10 illustrate the application of my invention to motors or dynamos of another type. In what I have referred to as the Gramme-ring type, as illustrated in Figs. 1 to 7, the action is due to the rotation of the coils or lines of force relatively to one another in such manner that at one instant the coils are perpendicular to the lines of force and inclose them, while at another instant they are in the same plane with them. In the type of machines which I am now about to describe, and to which alone the specific features of my present invention pertain, the lines of force are always perpendicular to the plane of the coils, and the action is due to a transition either from a dense to a feeble magnetic field, or from a magnetic field of one polarity to that of the opposite polarity, or, in other words, to variations in the number of the lines of force projected through the coils, or to changes in the direction of the lines of force relatively to the polarization of the coils. Most alternate-current machines are of this class, and my present invention applies to these as well as to continuous-current machines. The armature is, in general, of ring form, or, more exactly, of a circular arrangement; but the coils thereof are arranged with their axes parallel to one another and parallel to and equally distant from the axis of rotation. Fig. 8 is a vertical mid-section of a simple form of motor or dynamo of this class, the section being taken in the plane of the rotative axis. Fig. 9 is a front elevation of the armature and field coils, the field-magnet being omitted, and Fig. 10 is a front view of the field-magnet alone cut in section transversely of the axis. In this construction the armature A consists of twelve coils, *c c*, arranged equidistantly in a circle, with parallel axes. Within each coil is a short core, *j*. The coils *c c* are connected together serially in alternate order, so that a continuous current traversing them would impart to their cores alternately-opposite polarities. Between each two coils conductors *d d* lead to the respective segments *e e* of the commutator. A few of these connections are indicated in Fig. 9. If all the coils *c c* are wound in the same direction, their connections are alternately to inside and outside terminals, as shown.

The field-magnet F has a large central core, $b$, at each end of which are radial pole-pieces $a\ a$, which extend in the manner shown in Fig. 8 and terminate in close proximity to the ends of the cores $j\ j$, so that when one of these cores is in line with two opposite pole-pieces the magnetic circuit is closed in the manner indicated by the dotted lines of force in Fig. 8. There may be more or less of the radial pole-pieces $a\ a$, according to circumstances. For an alternating-current machine, for example, or for a machine to deliver rectified pulsatory currents, there should be six pole-pieces for a twelve-coil armature. For a continuous-current machine the number of pole-pieces should be greater or less than the number of pairs of armature-coils. For instance, with a twelve-coil armature the field-magnet may have five or seven pole-pieces. Fig. 10 shows a field-magnet with five pole-pieces at each end of its core. The opposite pole-pieces are arranged directly opposite each other. Either the armature or field-magnet may be the rotative member. I have shown the field-magnet as being rotative and the armature stationary. The field-exciting coil E is also stationary, being fixed in place within the armature. The lines of force generated in the field-magnet by a current in the coil E stream through the core $b$ in a short column or bundle and are distributed radially by the pole-pieces in a manner closely analogous to the distribution of lines of hydraulic pressure in a turbine water-wheel, where water from the central column is distributed radially to the circumferential buckets.

The action of a machine thus constructed does not differ materially from that of other machines of this type heretofore devised. There is the same commutation, the same alternate excitation of the successive armature-coils, and the same reversal of current in the respective coils at the instant of the passage of the pole-pieces. Suffice it to say that the excitation of the coils is such that all of the five pole-pieces on each side are attracted in the same direction, that as each pole-piece comes into line with the axis of any one of the coils the current in that coil is reversed, so that instead of continuing to attract the pole-piece it acts to repel it, and that when the said pole-piece has receded to a point where it and the next advancing pole-piece are equally distant from the coil the current in the latter is again reversed, in order that it shall attract the next following pole-piece. Whenever one of the five pole-pieces is directly in line with one of the coils, and consequently is for the instant being neither attracted nor repelled, the four remaining pole-pieces are all being attracted in forward direction with varying degrees of force, according to their varying distances from the respective coils which are acting upon them. I have here described the operation as it occurs in a machine used as an electromotor. In a dynamo the action will be the reverse of this, as is well understood.

My invention introduces a radical departure in the construction of electromotors or dynamos from any of the types heretofore known, by means of which are realized the following advantages among others.

The average length of the magnetic circuit can be made less and its aggregate cross-section greater than in any previous type of construction. The enlargement of the armature to proportions the most effective for electromotors is made possible without entailing the clumsy and abnormally long field-magnets needed for external closure of the magnetic circuit, while at the same time the mass of the field-magnet may be made sufficient to insure for it the most effective reaction with the armature, thus avoiding the abnormally-small field-magnets that are essential to the system of closure of the magnetic circuit wholly within the armature. It admits of the convenient division of large armatures into the consecutive magnetic sections which are found to add so greatly to their efficiency without involving multiple field coils and cores which have been hitherto deemed indispensable. In addition to these electrical or magnetic advantages, my invention introduces a feature of mechanical advantage which is practically of very great importance—namely, the ability to dispense with all moving wire, since both the armature and field coils may be made stationary, thus relieving the revolving part of the machine from the task of carrying with it a load of wire. By this means the electrical connections are also rendered more simple or convenient. While possessing these advantages, my invention does not introduce any unfavorable conditions. In fact, the opportunities of utilizing wire, of laminating iron, and avoiding cross-leakage are more favorable than with the common types of machines.

I will now proceed to describe in detail a fully-developed and practical electromotor constructed according to the principle of my invention, with reference to Figures 11 to 18 of the accompanying drawings.

Figure 11:
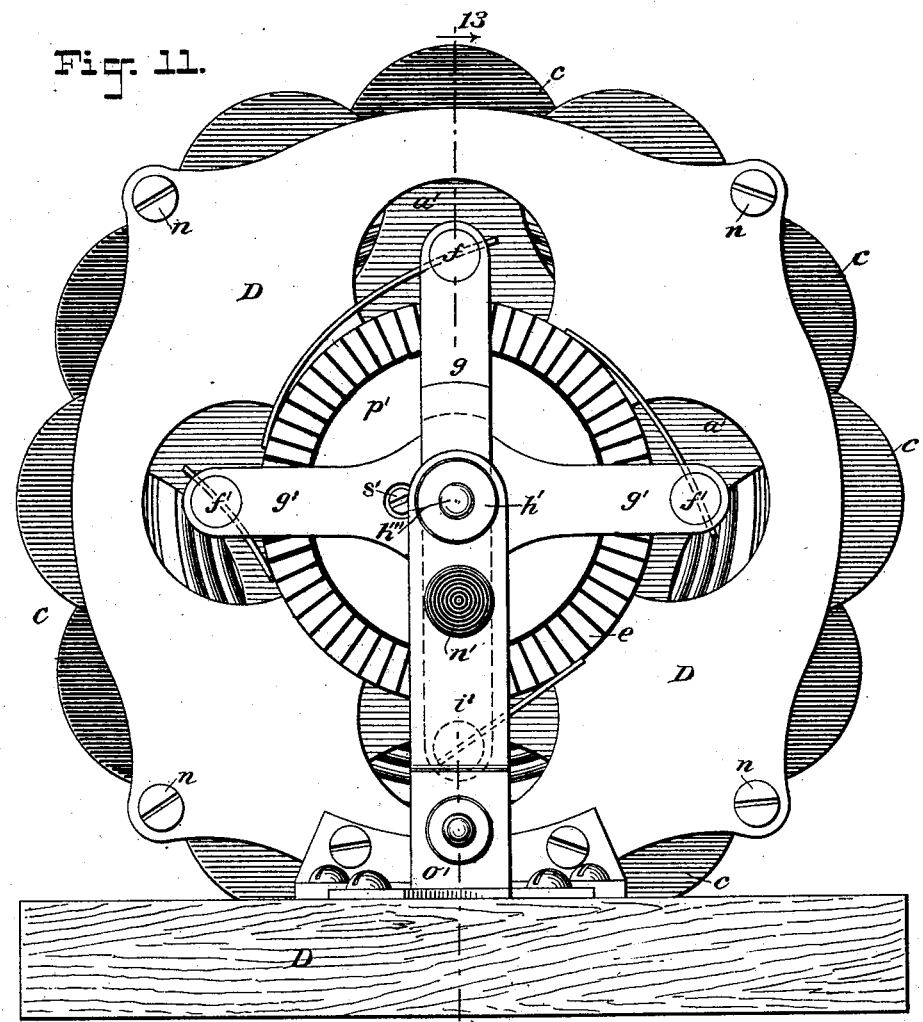
Figure 14:
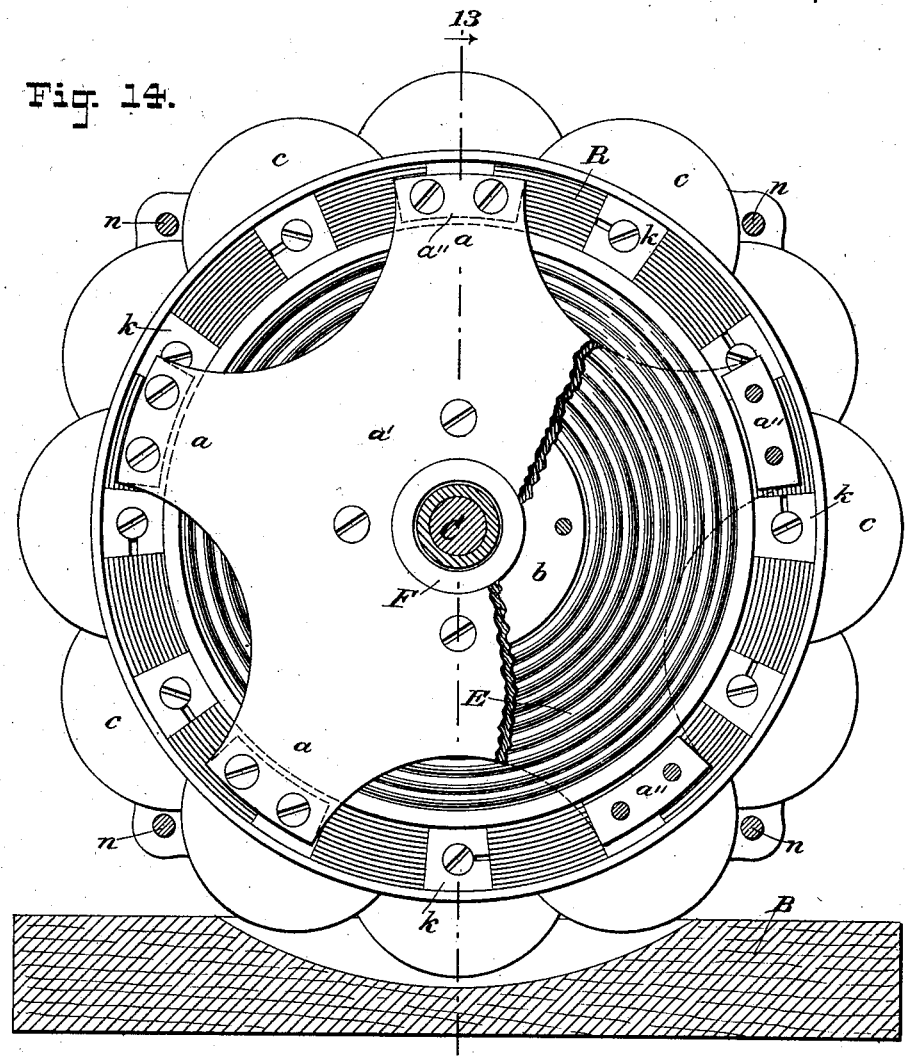
Figure 15:
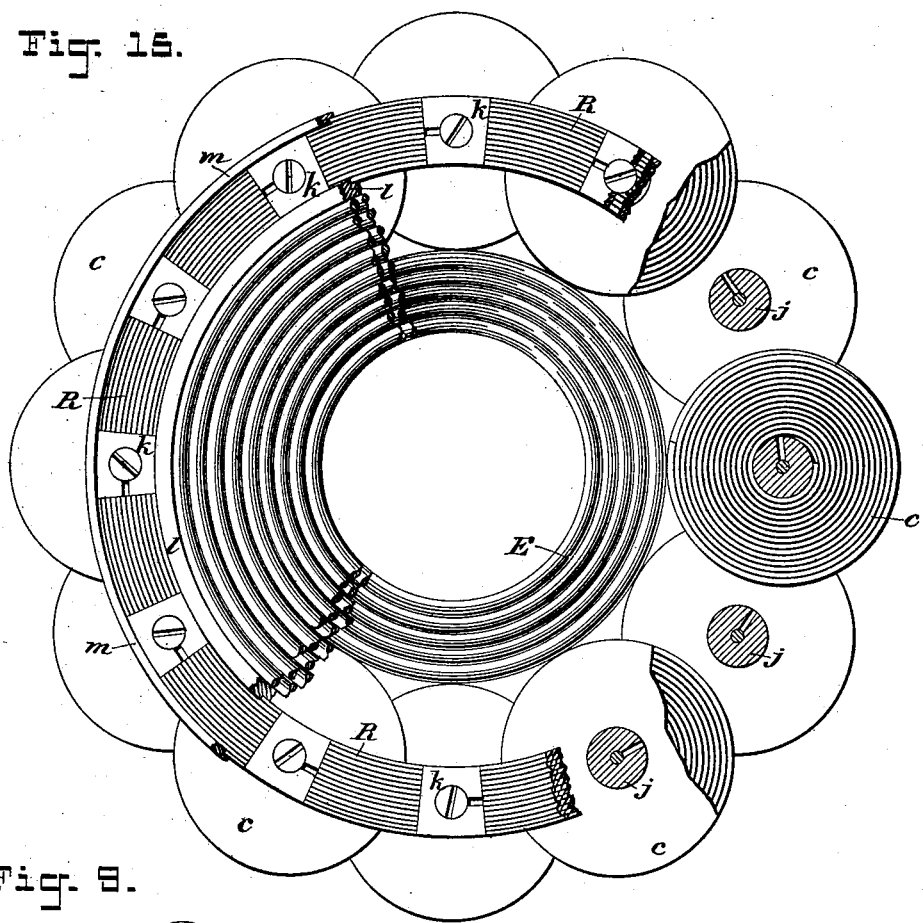

Fig. 11 is a front elevation of this improved electromotor. Fig. 12 is a side elevation thereof, the inclosing-case partly broken away to show the revolving pole-pieces. Fig. 13 is a vertical longitudinal section taken in the plane of the axis of rotation and looking in the same direction as Fig. 12. Fig. 14 is a front view, in vertical transverse section, cut in the plane of the line 14 14 in Figs. 12 and 13. Fig. 15 is a front view similar to Fig. 14, showing the armature and field coils, partially dissected or in section, cut in the several planes denoted by the three dotted lines 15 15 in Fig. 13. Fig. 16 is a diagram, being a development of the iron portions of the armature and the field-poles in a straight line. Fig. 17 is a perspective view of one of the conducting-washers; and Fig. 18 is a fragmentary section illustrating the connection of the commutator-brushes with the shaft, being an axial section at right angles to Fig. 13.

This machine is of the same general construction as the one described with reference to Figs. 8, 9, and 10. Its armature A has twelve coils *c c*, and is stationary, while its field-magnet F has five pole-pieces *a a*, and is rotative. On the base B are fixed two upright frames, D D, each of which has the shape shown in Fig. 11. These frames form bearings for the axial shaft C, on which is fixed the field-magnet F. The field-magnet consists of a thick tubular cylindrical core, *b*, which is fixed on the shaft, and two end pieces or heads, *a" a'*, which are fastened against the opposite ends of the core in the manner shown in Fig. 13, and which are of the shape shown in Fig. 14, being formed with five equidistant arms or pole-pieces, *a a*. To each of these projecting arms is fastened a block, *a"*, which blocks constitute the extreme pole-pieces or poles of the field-magnet, and approach each other in pairs on the opposite sides of the armature, as best shown in Fig. 12. The armature consists of twelve short cores, *j j*, on which are wound the coils *c c*, and of two magnetic rings, R R, which come against the ends of the respective cores on opposite sides of the armature. The cores *j j* consist of short thick tubes of soft iron, slitted along one side to prevent Foucault currents. They are confined between the rings R R by screws, which are passed through the rings and screw into the cores, as best shown in Figs. 13 and 15. The rings R R serve to make a magnetic connection between the poles of the successive cores, in order that there may be in the armature a succession of closed magnetic circuits. Thus the projection through the air of the lines of magnetic force generated in the armature, with the consequent waste of magnetic energy, is avoided. The action of the magnetic rings R R in developing closed magnetic circuits in the armature will be readily understood on reference to the diagram, Fig. 16, which is a development of the iron portion of the armature in a flat plane. The dotted lines in this figure illustrate the lines of force and show how they direct themselves in small short circuits extending from each core *j* through the rings in both directions to the next core and back. The rings R R are preferably laminated in order to prevent Foucault currents within them. Their construction is clearly shown in Figs. 13 and 15. Each ring is made by winding a soft-iron ribbon upon itself spirally, with a strip of insulating material to separate its convolutions. When a ring of sufficient thickness has thus been formed, twelve radial shallow notches or recesses are cut into it on one side, and into these are fitted twelve plates, *k k*, the surfaces of which come flush with the surface of the ring. These plates *k* are slitted to avoid Foucault currents. The screws by which the rings R R are united to the cores *j j* are passed through these plates *k k*. The cores *j j* may be wound with round insulated wire in the usual manner, as shown in Figs. 8 and 9; but I prefer to wind them with overlapping coils of copper ribbon in the manner shown. The copper ribbon is insulated by being wound with a thickness of paper, silk, or other material between its convolutions, and by means of disks of insulating material placed against the opposite sides of the spirals. Each coil covers only half the length of the core and has a diameter sufficient to cause it to overlap the adjoining coils on both sides. As the current flows in opposite directions in the successive coils, it necessarily flows in the same general direction—*i. e.*, toward or from the center of rotation—in the overlapping portions of the coils, so that the current in one coil co-operates with and re-enforces that in the next. The field-coil E is wound within the circle of armature-coils and extends up on either side thereof, in the manner shown in Fig. 13, nearly to the rings R R. Outside of the field-coil two rings, *l l*, are slipped over it and fit against and inside of the rings R R. The field-coil is thus united in a firm and solid manner to the armature. The armature is held in place by being connected with the fixed frames D D, through the medium of two tubular rings, *m m*, each of which fits into a concentric shoulder or rabbet on one of the frames D, and at its other side is formed with a rabbet which engages the outer corner or edge of the ring R. The frames D D are drawn together to tightly clamp the parts by means of screws or bolts *n n*. The rings *m m*, in connection with the frames D D, serve as a case for partially inclosing the rotating field, in order to protect the pole-pieces from contact with any obstructions that might otherwise get into their way.

I will now describe the commutator. It has fixed segments connected to the stationary armature-coils, and rotating brushes carried by the shaft C. Two positive and two negative brushes are shown, but one is sufficient. The two positive brushes *f f* are mounted on arms *g g*, both of which project from one hub, *h*, against the end of which is pressed a copper strip or take-off brush, *i*, all as shown in Fig. 13. The two negative brushes *f' f'* are mounted on two arms, *g' g'*, both of which project from a disk, *h"*, from the center of which a pin, *h'''*, projects axially, and on it is screwed a nut, *h'*, against the face of which is pressed a copper strip or take-off brush, *i'*, as shown in Figs. 11 and 13. The take-off strips *i* and *i'* are pressed into good electrical contact with the surfaces of *h* and *h'* by means of a screw, *n'*, of insulating material, which presses them apart. The respective strips are clamped to binding frames or posts *o* and *o'*, which are insulated from each other, and to which the respective circuit-wires are connected. Thus the terminals of the circuit are carried into the respective commutator-brushes *f f* and *f' f'*.

The fixed part of the commutator is carried by a cup, G, which is fastened to the front side of the frame D. On the exterior of this cup is formed a flange, *p*, and at the outer end of the cup is screwed or otherwise attached the flange or cap *p'*. The commutator-segments *e e* in this machine are sixty in number, (being the product of the twelve armature-coils multiplied by the five pairs of pole-pieces.) Each segment is notched on its front and rear sides in such manner that when the sixty segments are fitted together their notches coincide and form concentric grooves, into which are fitted rings $qq$, with intervening insulations, as shown in Fig. 13. The segments are clamped together and held in position by screwing on the flange $p'$.

On the outside of the cup G, in the space between the frame D and the flange $p$, are arranged twelve plates, $rr$, of metal, with intervening insulations. These plates are of ring or washer shape, and each has five arms, $r'r'$, projecting from it, as shown in Fig. 14. Between each of the two armature-coils a conductor, $d$, is connected, and extends thence to one of the twelve plates, $r$. There are twelve conductors $d$, and each connects with a different plate $r$. The five arms $r'r'$ are equidistant, and each one is bent forward and attached to a separate one of the commutator-segments $e$, as shown in Figs. 12 and 13. Thus the sixty commutator-segments are divided into five groups of twelve segments in each group, the first segment being connected to the first coil, the second segment to the second coil, and so on through the entire twelve segments of each group.

The two positive commutator-brushes should be so adjusted that when one of them is in contact with one of the five commutator-segments that are in connection with one plate $r$ and one coil the other brush will be in contact with any other one of these five segments, so that the current entering by these two brushes will reunite in the one plate $r$, and be thence conducted by the one conductor $d$ to one pair of coils. The negative brushes $f'f'$ are likewise arranged to make contact both with the segments of one set of five. The brush-arms $gg'$ are connected to the shaft C through the medium of a hub, H, of insulating material, which is slipped on the end of the shaft, within the cup G, and is fastened to the shaft, through the medium of a set-screw, in the manner shown in Fig. 18. Referring to this view, $s$ is a sliding key, which is placed in a hole or slit formed in the hub H, and which is itself formed with a round hole, through which passes eccentrically a screw, $s'$, which is formed with a cone engaging the key $s$. The screw $s'$ extends parallel with the shaft, so that it may be readily reached, by means of a screw-driver, from the front. On screwing it in, its cone engages the key and presses the latter forcibly toward the shaft, thereby binding the hub H firmly upon it in such manner that the brushes cannot become displaced or get out of lead.

The general method of commutation employed in this machine is not in itself novel; but to enable it to be well understood, as applied to the proportion of parts shown, I will briefly describe its action.

As the brushes revolve forward, successive reversals of current occur in the armature-coils in a backward direction. An imaginary diametrical line crossing the armature from the point where the current enters and divides to the point where the current reunites and leaves the armature, and which may be called the "neutral line," rotates backward one-twelfth of a revolution while the field-magnet moves forward one-fifth of a revolution. Each coil is thus reversed ten times to each revolution of the field-magnet, so that there are one hundred and twenty reversals to each complete revolution. In each coil the current flows in one direction during one-tenth of a revolution, while it is attracting a pole of the field-magnet, and it is then reversed for the ensuing one-tenth of a revolution, during which it acts to repel this pole. At each one-sixtieth of a revolution two diametrically-opposite coils are reversed.

The reactions of the field-magnet pole against the armature may be readily understood from a study of Fig. 16. The lines of force stream across from the north poles on one side to the south poles on the other, following almost entirely the iron of the armature. It will be observed that these lines of force are all deflected in one direction, as denoted by the arrow. This is due to the reaction of the lines of force set up in the armature by the coils thereof. The well-known tendency of the lines of force to shorten themselves results in driving forward the field-magnet poles.

My invention may be modified in many ways without departing from its essential features. As an instance of one such modification, I have introduced herein the construction shown in Figs. 19 and 20. Fig. 19 is a vertical longitudinal section of the machine in the plane of the axis of rotation, and Fig. 20 is a front view thereof, partly in section, cut in the plane of the line 20 20 in Fig. 19. The machine shown in these figures is designed as a dynamo for generating continuous currents. The field-magnet F is of greater mass than in the previous construction and has a larger exciting-coil. The core $b$, instead of being compact and solid, or nearly so, as before, consists of a large open tube around which is wound the exciting-coil E. This tube $b$ is confined between the polar disks $a'a'$, which are formed with eight radiating arms or pole-pieces $a\,a$, which approach each other, leaving only room between them for the armature. The field-magnet and its coil are stationary, being fastened on the central shaft, C, which is itself clamped fast to the bearing-frames D D. The armature A is made rotative, being mounted in a shell or casing, P, which serves also as a pulley for carrying a belt in order to drive the armature. This casing or pulley P consists of the outer annular part or pulley-face and two disks, P' P'', between which it is clamped, and which has hubs which turn on the shaft C. The armature is connected to the pulley P by means of a fixed flange, $m$, which comes against one of the rings R of the armature, and a separate ring, m', which fits against the other ring R of the armature, so that the armature is confined by the drawing together of these two rings, by means of screws or bolts n n, which may also serve to unite the disks P' P' to the pulley-face. With the proportions shown, the armature has sixteen coils, while the field-magnet has nine pole-pieces. Since the number of pole-pieces is greater than the number of pairs of coils, the action of the commutator is necessarily modified. I have shown, with reference to the construction already described, that when the number of pole-pieces is less than half the number of coils the "neutral line" in the armature, if the latter be stationary, rotates backward, and that when the number of pole-pieces is greater than half, the neutral line rotates forward. In this case if the armature were stationary and the pole-pieces revolving the neutral line would revolve forward with nine times the rapidity of the poles; but since in this machine the armature revolves forward while the field-magnet is stationary, the neutral line actually revolves backward (i. e., in the opposite direction to the armature) with a velocity, as compared with the armature, of nine to one; but as compared with a stationary part it revolves backward eight times while the armature is revolving forward once. This may be accomplished by means of stationary commutator-brushes and a commutator of nine successive series of sixteen segments in each, (i. e., of one hundred and forty-four segments in all;) but the method shown in the drawings accomplishes this purpose by different means—namely, by rotating the commutator-brushes backward at a speed of eight revolutions while the armature and commutator-segments are revolving forward one revolution. The commutator-segments e e are carried on the hub of one of the disks P'. Attached to this disk is an internally-toothed ring or internal gear, I, which gears with a pinion, J, fixed on a short shaft, J', which is hung in stationary bearings. On the shaft J' is fixed a gear, K', which meshes with a pinion, K, that turns freely on the stationary shaft C. Proportions of the several gears I, J, J', K', and K are such that a rotation of I in one direction causes a rotation of K at eight times the velocity in the opposite direction. Attached to the pinion J are the brush-arms g g', carrying the brushes f f', and which are connected, respectively, with two insulated rings, h h', which are swept by take-off brushes i and i'. The respective movements of the commutator segments and brushes result in two hundred and eighty-eight reversals of current in the armature-coils to each revolution of the armature.

My invention is adapted to magneto-electric machines, as well as to dynamo-electric machines. For such it is only necessary to employ permanent magnets for the field-magnet F and omit the exciting-coil E.

In order to make an alternating-current dynamo according to my invention, the field-magnet should be given as many pairs of poles as half the number of coils in the armature. The winding of the armature-coils and the construction of the commutator or collector will be precisely the same as in alternating-machines of this class heretofore made.

I claim as my invention, in a dynamo-electric machine or electromotor, the following defined novel features and combinations, substantially as hereinabove specified, namely:

1. A ring-armature wound with coils developing magnetic poles alternating in polarity as the armature is traversed circumferentially, in combination with a field-magnet extending through the open center of the armature and having its contrary poles disposed adjacent to the armature on opposite sides thereof.

2. A ring-armature wound with coils developing magnetic poles alternating in polarity as the armature is traversed circumferentially, and a commutator to which the terminals of said coils are connected, and which is adapted to alternately reverse the current in each coil and to effect successively the reversals of current in the successive coils, in combination with a field-magnet extending through the open center of the armature and having its contrary poles disposed adjacent to the armature on opposite sides thereof.

3. A ring-armature wound with coils developing magnetic poles alternating in polarity as the armature is traversed circumferentially, in combination with a field-magnet extending through the open center thereof and formed with radial pole-pieces disposed equidistantly around the circumference of the armature, with the poles of contrary polarities on opposite sides of the armature.

4. A ring-armature wound with coils developing magnetic poles alternating in polarity as the armature is traversed circumferentially, in combination with a field-magnet having its middle portion or core extending through the open center of the armature in a direction substantially parallel with the axis of rotation and having its contrary poles disposed adjacent to the armature on opposite sides thereof, and an exciting-coil for said field-magnet arranged to inclose said core, and in inductive proximity thereto.

5. A ring-armature wound with coils developing magnetic poles alternating in polarity as the armature is traversed circumferentially, in combination with a field-magnet having its middle portion or core extending through the open center of the armature in a direction substantially parallel with the axis of rotation and having its contrary poles disposed adjacent to the armature on opposite sides thereof, and an exciting-coil for said field-magnet arranged within the armature and inclosing said core in inductive proximity thereto.

6. The combination, with a non-rotative ring-armature wound to form circumferentially-alternating poles, of a rotatively-mounted field-magnet extending through the open center of the armature and having its contrary poles disposed adjacent to the armature on opposite sides thereof.

7. The combination, with a non-rotative ring-armature wound to form circumferentially-alternating poles, of a rotatively-mounted field-magnet extending through the open center of the armature and having its contrary poles disposed adjacent to the armature on opposite sides thereof, and a non-rotative exciting-coil for said field-magnet arranged to inclose the same.

8. The combination of a ring-armature consisting of a succession of oppositely-wound coils arranged in a circle with their axes parallel to the axis of rotation, with a field-magnet extending through the open center of the armature and having pairs of poles of contrary polarity disposed oppositely to one another and adjacent to the opposite sides of the armature, those of one polarity being disposed on one side of the armature and those of the opposite polarity on the opposite side thereof.

9. The combination of a ring-armature consisting of a succession of oppositely-wound coils arranged in a circle with their axes parallel to the axis of rotation, with a field-magnet consisting of a core extending through the open center of the armature, and radial pole-pieces at opposite ends of said core extending to equidistant points around the circumference of the armature, with the poles of contrary polarities arranged in pairs opposite to each other and on opposite sides of the armature.

10. The combination of a ring-armature consisting of a succession of oppositely-wound coils arranged in a circle with their axes parallel to the axis of rotation, with a field-magnet extending through the open center of the armature and having radial pole-pieces extending to equidistant points around the circumference of the armature, with the poles of contrary polarities arranged in pairs opposite to each other and on opposite sides of the armature, the said pairs of poles being greater or less in number than half the number of coils in the armature, and with a commutator adapted to reverse the current in each coil of the armature whenever any pair of poles reaches a position opposite thereto, and to again reverse the current therein whenever any two successive pairs of poles reach positions equally distant therefrom.

11. The combination of a ring-armature consisting of a circular series of cores wound with coils and arranged with their axes parallel to the axis of rotation, and two iron rings fastened against opposite ends of said cores, with a field-magnet extending through the open center of the armature and having pairs of poles of contrary polarity disposed oppositely to one another on opposite sides of the armature and closely adjacent to said iron rings, whereby said rings serve to form closed magnetic circuits between the successive cores of the armature and between the field-magnet poles and the armature-cores.

12. A ring-armature consisting of a circular series of cores wound with coils and arranged with their axes parallel to the axis of rotation, and two iron rings fastened against opposite ends of said cores, whereby said rings serve to form closed magnetic circuits between the successive cores, in combination with a field-magnet having pairs of poles of contrary polarity arranged face to face on opposite sides of the armature and closely adjacent to said iron rings.

13. The combination, to form a ring-armature, of a circular series of cores wound with coils and arranged with their axes parallel to the axis of rotation, and two iron rings fastened against opposite ends of said cores, and constructed of spiral laminæ having their convolutions insulated from one another for the prevention of Foucault currents.

14. The combination, to form a ring-armature, of a circular series of cores wound with coils and arranged with their axes parallel to the axis of rotation, two iron rings arranged against the opposite ends of said cores, constructed of insulated spiral laminæ, metal plates sunk flush into said rings opposite the respective cores, and screws passed through said plates into the cores to bind them together.

15. The combination, to form a ring-armature, of a circular series of cores arranged with their axes parallel to the axis of rotation, two iron rings fastened against opposite ends of said cores, and flat coils wound on said cores and overlapping one another.

16. The combination of a ring-armature consisting of a circular series of cores wound with coils and arranged with their axes parallel to the axis of rotation, a field-exciting coil wound around the axis of rotation within and fixed to said armature, and a field-magnet consisting of a central core arranged to revolve within said exciting-coil, and radial pole-pieces fastened to opposite ends of said core, extending beyond said exciting-coil at both ends thereof, and terminating in poles closely adjacent to the armature on opposite sides thereof.

17. The combination of a ring-armature consisting of a circular series of cores wound with coils and arranged with their axes parallel to the axis of rotation, and two iron rings fastened against opposite ends of said cores, a field-exciting coil wound within and fixed to said armature, two fixed bearing-frames, between which said armature is arranged and to which it is fixed, an axial shaft having bearings in said frames, and a field-magnet consisting of a central core fixed on said shaft within said exciting-coil, and radial pole-pieces fastened to opposite ends of said core, extending past the ends of said exciting-coil between said fixed frames, and terminating in close proximity to the opposite sides of said armature.

18. The combination of a stationary ring-armature having its coils wound in successively opposite directions, a revolving field-magnet, and a commutator consisting of as many stationary segments as the product of the number of armature-coils multiplied by the number of pairs of field-poles, connections between such coils and segments, whereby to each coil are connected as many segments equidistantly disposed as the number of pairs of field-poles, and the commutator-brushes carried by the revolving shaft on which the field-magnet is mounted.

19. The combination of a stationary ring-armature having its coils wound in successively opposite directions, a revolving field-magnet, and a commutator consisting of as many stationary segments as the product of the number of armature-coils multiplied by the number of pairs of field-poles, with brushes carried by the revolving shaft upon which the field-magnet is mounted, and connections between the armature-coils and commutator-segments consisting of a series of washers connected, respectively, to the respective coils and each having as many radial arms equidistantly disposed as the number of pairs of field-poles, and said arms joined to the respective segments.

20. In a commutator, the combination, with stationary segments, of a revolving shaft, revolving brushes traversing said segments and carried by said shaft, a hub arranged on said shaft and to which the arms carrying said brushes are fixed, a key for clamping said hub to said shaft arranged in a recess in said hub and movable in radial direction, and a set-screw in said hub arranged longitudinally of said shaft and having a conical portion engaging said key, whereby on tightening said screw said key is forced against the shaft, thereby securing the hub in place thereon.

21. In a commutator, the combination, with stationary segments, of a revolving shaft, revolving brushes traversing said segments and carried by said shaft, opposite insulated contact-rings carried by said shaft and connected, respectively, with the positive and negative brushes, take-off strips in contact with said rings, respectively, and an insulated screw arranged to press said strips apart and against the respective contact-rings.

In witness whereof I have hereunto signed my name in the presence of two subscribing witnesses.

WILLIAM MAIN.

Witnesses:
ARTHUR C. FRASER,
GEORGE H. FRASER.